United States Patent [19]

Holt, Jr.

[11] 4,298,907
[45] Nov. 3, 1981

[54] FLASH ATTACHMENT WITH EXTENDABLE HEAD

[76] Inventor: Raymond B. Holt, Jr., 3341 Gulfstream La., Marietta, Ga. 30062

[21] Appl. No.: 73,848

[22] Filed: Sep. 10, 1979

[51] Int. Cl.³ .............................................. G03B 15/02
[52] U.S. Cl. .................................. 362/4; 362/5; 362/18; 362/419; 362/449; 362/450
[58] Field of Search ............... 362/4, 5, 18, 419, 449, 362/450

[56] References Cited

U.S. PATENT DOCUMENTS

| | | | |
|---|---|---|---|
| 3,273,479 | 9/1966 | Jakob | 362/5 |
| 3,418,906 | 12/1968 | Wick et al. | 362/14 |
| 3,864,606 | 2/1975 | Watrous | 362/15 |
| 4,051,493 | 9/1977 | Nakagawa | 362/3 X |
| 4,091,402 | 5/1978 | Siegel | 362/3 |
| 4,136,377 | 1/1979 | Fohl | 362/14 |
| 4,187,021 | 2/1980 | Balser | 362/15 |

*Primary Examiner*—Stephen J. Lechert, Jr.
*Attorney, Agent, or Firm*—Jones, Thomas & Askew

[57] ABSTRACT

A flash attachment for a hand held camera having a flash head pivotally mounted on an extendable member. A main unit together with a plurality of modular auxiliary units which may be used to construct the attachment are shown. One embodiment shows a plurality of flash heads and means for firing them rapidly and sequentially while recharging in the same sequence.

8 Claims, 10 Drawing Figures

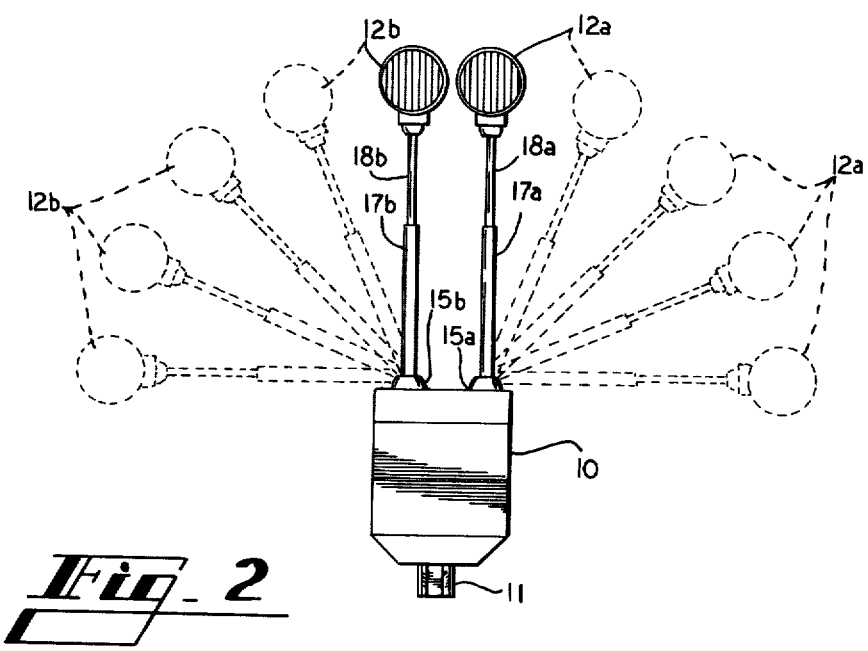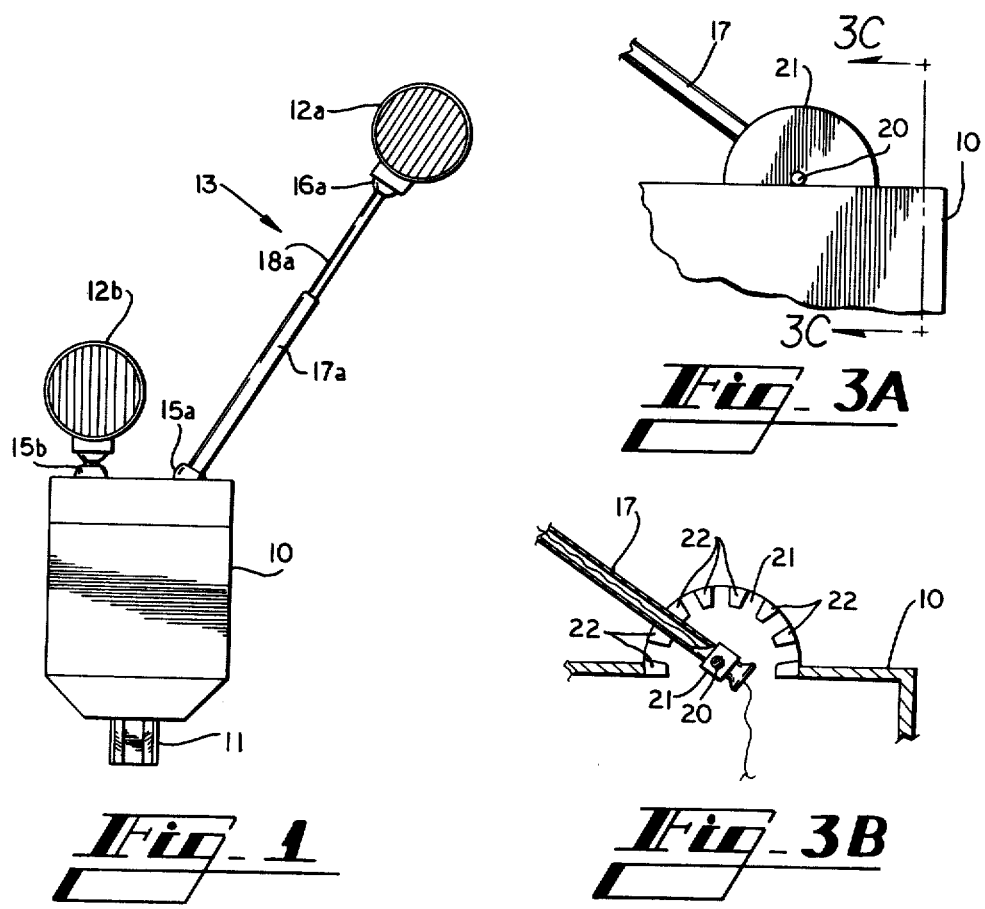

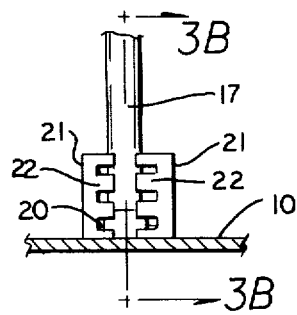
Fig_3C
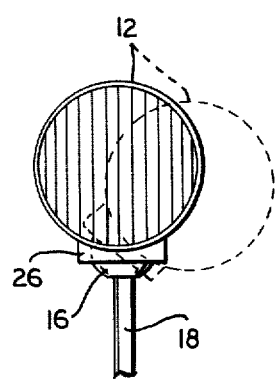
Fig_4A
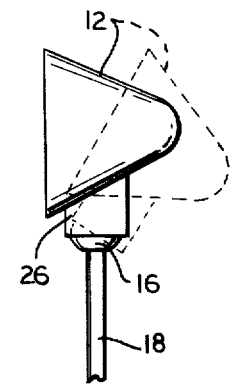
Fig_4B
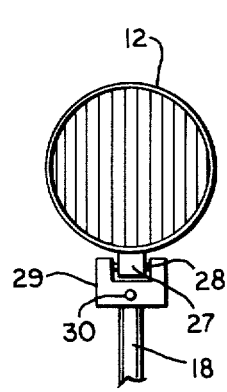
Fig_4C
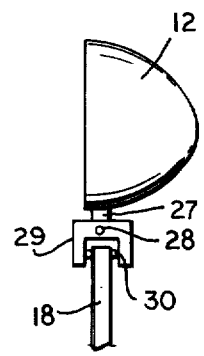
Fig_4D
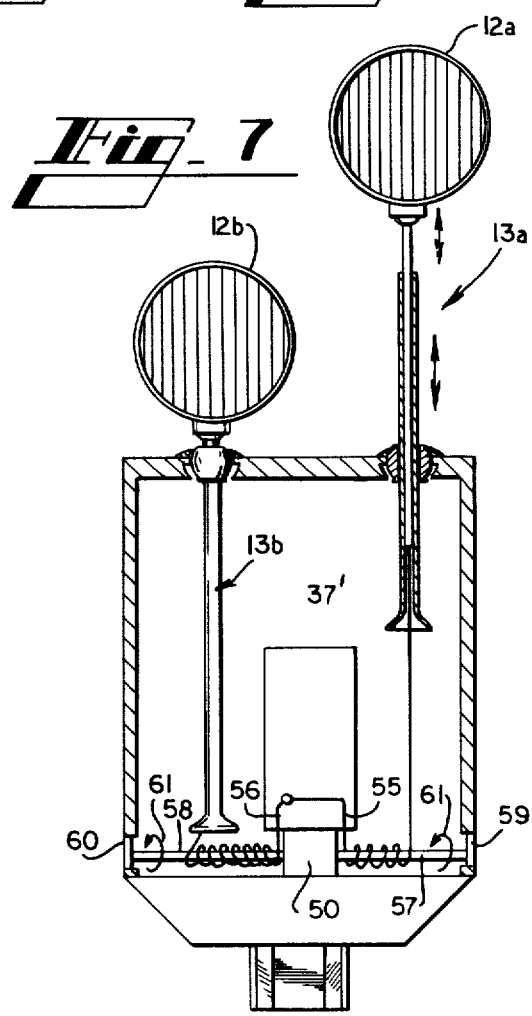
Fig_7

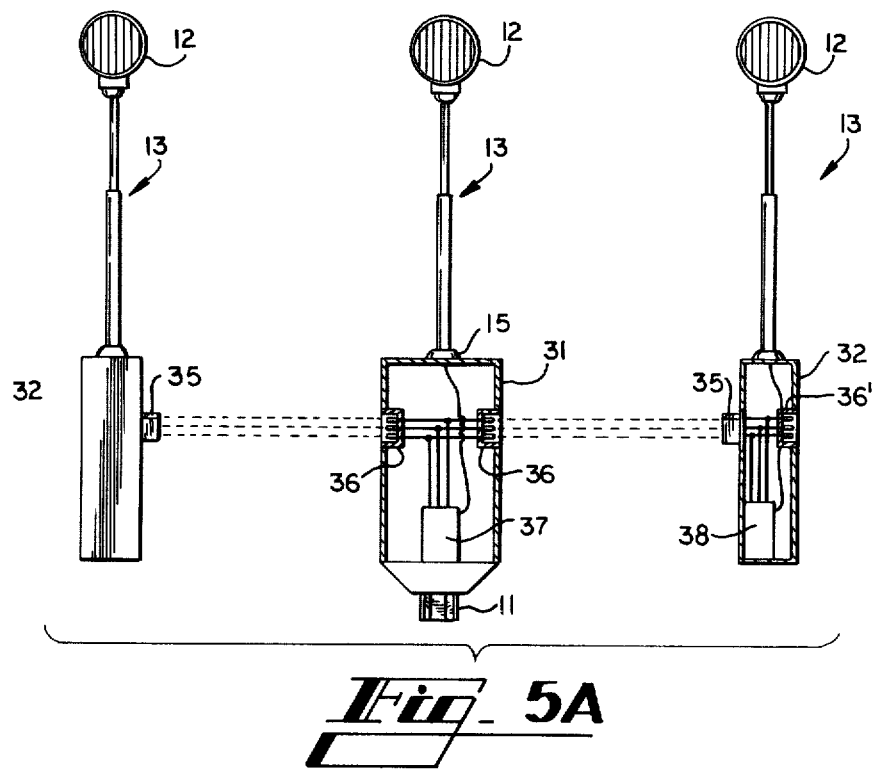
Fig. 5A
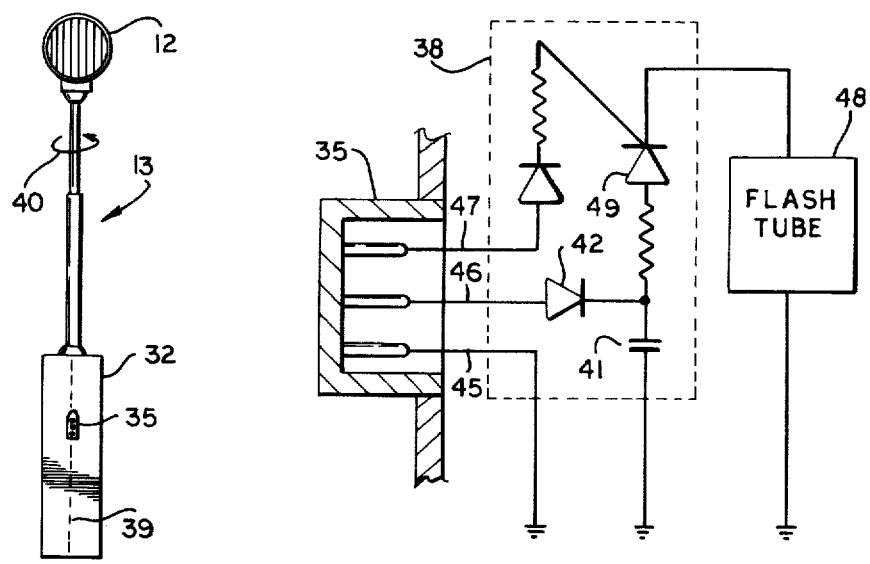
Fig. 5B
Fig. 6

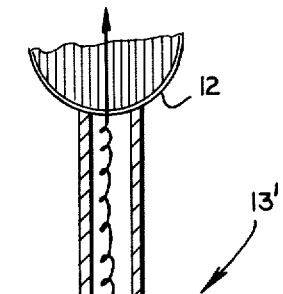
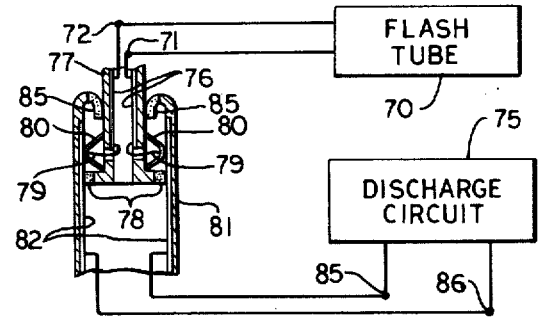
Fig. 9
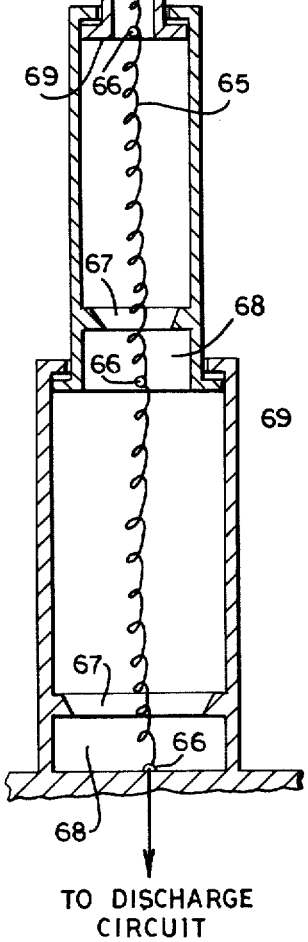
TO FLASH TUBE
TO DISCHARGE CIRCUIT
Fig. 8
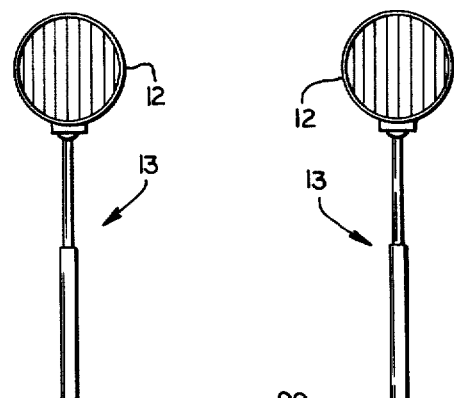
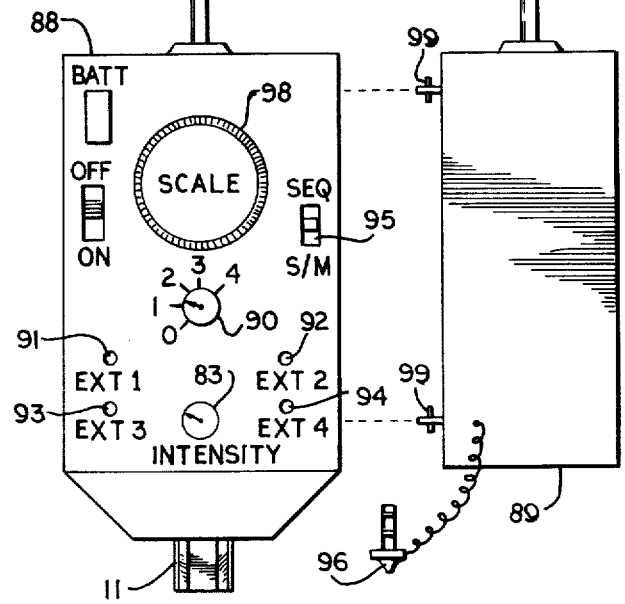
Fig. 10

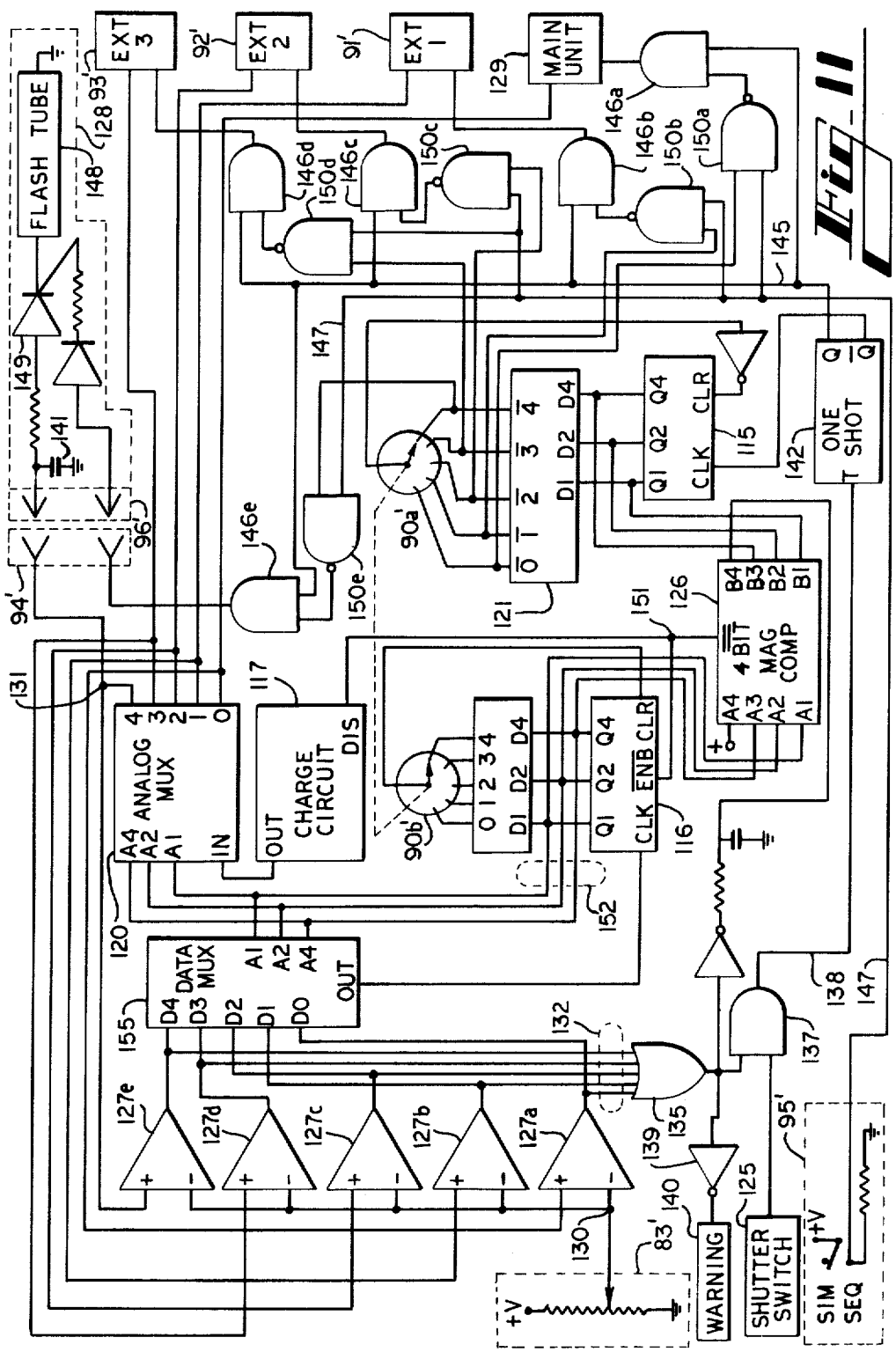

FLASH ATTACHMENT WITH EXTENDABLE HEAD

TECHNICAL FIELD

The present invention relates to flash attachments for cameras and more particularly to the field of lightweight flash attachments for hand held cameras.

BACKGROUND OF THE INVENTION

Since the second World War there has occurred in this country and throughout the world a widespread increase in the public's awareness of the art of photograhy. In more recent years there has been a great proliferation of sales of inexpensive cameras using film cartridges as well as an increased sales of higher quality 35 mm cameras. The proliferation of cameras has spawned a proliferation of flash devices for taking pictures in otherwise insufficient lighting conditions. These flash devices have included both those using expendable flashbulbs and those using reusable flash tubes.

Conventional flash tube flash attachments use a charged capacitor as the power source to drive the flash tube upon ignition. Conventionally, a charging circuit will operate from a low voltage battery which drives an oscillator which in turn drives a transformer to raise the voltage which is then rectified and used to charge the firing capacitor.

Conventional flash attachments using reusable flash tubes comprises a means for attaching, both physically and electrically, the attachment to the camera in question; a body which includes the circuitry for charging the firing capacitor; and a flash head which houses the flash tube and an appropriate reflector.

As is known to those skilled in the art of photography the taking of a picture with a conventional flash light source creates certain problems which must be compromised when a flash is to be used with a portable hand held camera.

In order to minimize the effects of shadows it is desirable to have multiple flashes aimed at the subject from different directions so that the centers of the illuminated areas tend to intersect near the subject. Conventionally this is possible only with equipment in a fixed location such as that in a photograph's studio.

In the use of portable hand held cameras with a flash attachment mounted directly on the camera, it has been possible to hold the camera steady using both hands, but this has necessitated rather direct lighting which causes problems with both shadows in the picture and eye redness of human and animal subjects. As is known to those skilled in the art of photography the problem of eye redness from a direct flash occurs when light from the flash is reflected directly off of the retina of the subject and back into the camera lens.

It has been known to provide a flash attachment which includes a rotatable flash head for using "bounce flash" techniques but this requires surfaces close to the subject of relatively high reflectivity.

As a compromise in the use of flash equipment with hand held cameras, it has been known in the art to provide a detachable flash which is electrically connected to the camera body via a cord that may be held in one hand while the camera proper is held in the other. This compromise tends to eliminate the problem of eye redness and to diminish the problem of shadows from direct illumination but makes it much more difficult for the user to steadily hold the camera since only one handis available for this task.

SUMMARY OF THE PRESENT INVENTION

The present invention may be broadly characterized as a flash attachment for a portable camera having an extendable flash head containing reflector and a flash tube. By providing only reflector and flash tube at the distal end of a member extending from the flash attachment body, an extremely lightweight portion of the apparatus is placed at the end of the extending member and thus the extending member may be secured to the main flash attachment body by means of an inexpensive friction fitting.

By providing a pivot with multiple degree of freedom between the extending member and the flash head, such as a ball and socket joint or a universal joint, the flash head may be rotated in a number of directions to achieve better lighting effects than heretofore possible with simple flash attachments for hand held cameras.

Therefore it is an object of the present invention to provide a flash attachment for a portable camera having a lightweight extendable flash head placed at the distal end of an extending member which is attached to the main body of the flash attachment.

According to one aspect of the present invention the extending member is a telescoping member of a type similar to telescoping antenna used in portable radios and televisions.

According to another aspect of the present invention two or more extendable flash heads are provided on the same flash attachment. These multiple flash heads may be extended and pivoted in a plurality of directions so that, for many types of work, the advantages of multiple flash studio lighting may be obtained with a flash attachment on a portable camera. For example, spreading a pair of flash heads apart so that their illuminated areas converge near the subject will prevent eye redness for a human or animal subject, eliminate many undesirable shadows that would appear with a conventional flash attachment and still allow the user of the camera to use both hands in holding and operating same. Such an arrangement also eliminates the need to rely on "bounce flash" techniques.

Therefore it is an object of the present invention to provide a plurality of lightweight extendable flash heads which may be extended from the main body of a flash attachment and pivoted in a plurality of directions.

According to still another aspect of the present invention, each of the plurality of flash heads referred to above is provided with its own separate capacitor and an otherwise conventional means for adjusting the charge on the flash head capacitor. Therefore, under a given set of conditions for ambient light, film speed, and shutter opening, it is possible to divide the appropriate amount of light intensity between (or among) the plurality of flash heads of the present invention. By providing an individual capacitor with each flash head it is also possible to double the light intensity which would otherwise be available with a single flash head.

According to still another aspect of the present invention it is considered desirable to provide a main unit which attaches directly to a camera and includes at least one extendable flash head and an appropriate capacitor charging circuit, in combination with a plurality of modular auxiliary units each including an extendable flash head, a capacitor for the flash tube of the auxiliary unit, and appropriate mechanical and electrical connections for attaching each auxiliary unit to the main unit.

According to another aspect of the present invention each of the auxiliary units is appropriately fitted to accept another auxiliary unit so that the auxiliary units may be cascaded or placed in a "daisy chain" from the main unit.

Since each auxiliary unit comprises the extendable flash head, a light weight extending member, the capacitor, and a minimal amount of circuitry to control firing of the flash tube, it may be appreciated that such auxiliary units may be very light weight and that simple inexpensive mechanical attachments between the auxiliary units and the main unit will be sufficient.

According to still another aspect of the present invention a plurality of extendable flash heads are provided and a means for firing the flash heads sequentially upon each occurrence of the signal indicating the shutter is opening is also provided. This is particularly useful in conjunction with a camera having a motor driven film advance. For example, if a photographer is photographing a fast paced indoor sporting event such as a basketball game, it is common to use a camera with a motor driven film advance in order to get a plurality of "shots" within a matter of a few seconds. Heretofore, in order to take advantage of the speed benefits of using a flash attachment, it has either been necessary to allow a conventional flash attachment several seconds to recharge (thus possibly missing an important photograph) or to use a bar of sequentially fired disposable flash bulbs, a comparatively expensive alternative. With the present invention it is possible to provide an array of flash tubes which may be reused thousand of times each, and which will provide a flash for each photograph in a series of photographs taken in very close time proximity.

These and other objects and aspects of the present invention will become apparent from the detailed description of several embodiments set forth herein below.

BRIEF DESCRIPTION OF THE DRAWINGS

FIG. 1 is a front elevational view of a first preferred embodiment of the present invention.

FIG. 2 is another front elevational view of the first preferred embodiment of the present invention.

FIGS. 3a through 3c show details of one embodiment of the extendable pivot mounting of the present invention.

FIGS. 4a through 4c show details of alternative embodiments of the flash head mounting of the present invention.

FIG. 5a is a front elevational view of a second preferred embodiment of the present invention.

FIG. 5b is a side elevational view of one auxiliary unit of the second preferred embodiment of the present invention.

FIG. 6 is a schematic representation of the electrical circuitry of each auxiliary unit of the second preferred embodiment of the present invention.

FIG. 7 is a cut away view of the interior of the first preferred embodiment of the present invention showing an embodiment of the electrical connection between the flash head and discharge circuit.

FIG. 8 shows an alternative embodiment for the electrical connection between flash head and discharge circuit for the present invention.

FIG. 9 is a side view and cross section of one embodiment of the extending member of the present invention.

FIG. 10 is a front elevational view of a third preferred embodiment of the present invention.

FIG. 11 is a schematic representation of the circuitry for controlling the third preferred embodiment of the present invention.

DETAILED DESCRIPTION

Turning first to FIG. 1, a front elevational view of the first preferred embodiment of the present invention is shown. This embodiment comprises a housing 10 which may be constructed of conventional plastic or metal, rigidly attached to a conventional attachment member 11 for providing a mechanical and electrical connection to a camera. While FIG. 1 shows an attachment 11 conventionally used with standard 35 mm cameras, it is to be understood that the present invention is not so limited and that it would be within the level of ordinary skill in the art to construct embodiments of the present invention which may be attached to other types of cameras.

The first preferred embodiment comprises a pair of extendable flash heads 12a and 12b each of which is attached to an extendable member 13.

The flash heads of the preferred forms of the present invention shown herein contain conventional reusable flash tubes. However it will be appreciated that the advantages of the present invention will also manifest themselves in embodiments using disposable flash bulbs in heads 12a and 12b. Therefore the light source contained in flash heads 12a and 12b may be generically referred to as a light emitting discharge element.

In FIG. 1, flash head 12a is shown as attached to a telescoping extendable member 13 comprising members 17a and 18b. Flash head 12a is secured to the distal end of member 13 via a ball and socket joint 16 which will be understood to be a conventional friction fitting ball and socket joint which may be used to pivot head 12a about the distal end of member 18a.

The extendable telescoping member is attached to body 10 of the first preferred embodiment via a ball and socket joint comprising ball 15 in a socket within the top of the first preferred embodiment.

As may be seen from FIG. 1 ball 15 may be rotated in such a manner so as to extend member 13a through a solid angle approaching 2 pi steradians.

As may be seen from FIG. 1 the second flash head 12b is shown in its retracted position.

As may be seen from FIG. 2, both heads 12a and 12b are provided with telescoping extending members; head 12b being associated with a member comprising member 17b and 18b.

It may also be seen from the phantom positions of heads 12a and 12b shown in FIG. 2 that balls 15a and 15b of the ball and socket joints for the respective flash heads 12a and 12b allow pivoting of the flash heads to any desired position.

FIGS. 3a through 3c show an alternative means for pivoting the extendable member supporting the flash heads. FIG. 3a is a detail showing a front elevational view of the alternative means for pivoting. The alternative means include an arcuate element 21 rigidly attached to body 10 and having therethrough an axis 20 about which member 17 pivots. FIG. 3c is a section taken along line c—c shown in FIG. 3a. From FIG. 3c it may be seen that the alternative means for pivoting the extendable member 17 comprises a pair of arcuate clamping members 21 each having a plurality of spaced-apart teeth 22 extending therefrom towards member 17.

FIG. 3b is a front elevated cross section taken along line b—b shown in FIG. 3c. As may be seen from FIG. 3b rotational axis 20 comprises part of a gimbal which comprises rotational support sleeve 21 and rotational axis 20. Extendable member 17 is journaled snugly within rotational support member 21 and will be held in its position along its longitudinal axis by the friction between member 17 and support member 21.

Two arcuate clamping members 21 may be made of any suitable material which is stiff but flexible. It is preferred that the two members 21, or at least the teeth 22 thereof, be constructed of a synthetic resin polymer similar to that sold by E.I. duPont Company under the tradename Teflon. Of course other materials such as hard rubber or nylon may also be used. From FIGS. 3b and 3c it may be seen that alternative embodiments for supporting member 17 provides a plurality of "click-stops" to position member 17 and thus the flash head at various positions in a plane perpendicular to rotational axis 20.

Since the combination of the flash head (not shown in FIG. 3) and extendable member 17 is very light, it is easy to fabricate teeth 12 in such a manner that they are flexible enough to be easily displaced when extendable member 17 is rotated about axis 20 yet stiff enough to hold member 17 in the selected position.

FIGS. 4a through 4d show alternative preferred methods for mounting flash head 12 onto the distal portion 18 of the extendable members of FIG. 2.

FIGS. 4a and 4b show the preferred mounting of the type shown in FIG. 2 which includes a ball and socket joint comprising ball 16 secured to the distal end of member 18 and a socket therefor which resides in flash head base 26. As may be seen from the phantom positions shown for flash head 12 in FIGS. 4a and 4b the ball and socket mount for flash head 12 allows the flash head to be rotated through a solid angle of approximately 2 pi steradians.

FIGS. 4c and 4d show an alternative means for mounting flash head 12 on member 18. The alternative means for mounting flash head pivotally at the end of member 18 include a gimbal bracket 29 having therethrough pivotal axes 28 and 30. As may be seen from FIGS. 4c and 4d axes 28 and 30 are perpendicular to each other. Axis 28 extends through flash head support member 27. It is to be understood that axis 28 is snugly journaled within a hole passing through flash head support member 27 and, due to the very light weight of flash head 12, is held in position by the friction between support member 27 and the axis 28.

Similarly axis 30 is snugly journaled in a cylindrical hole passing through member 18 and friction therebetween will hold gimbal bracket 29 and head 12 in a selected position.

It will be understood that other equivalent means for pivotally mounting flash head 12 onto member 18 are possible without departing from the scope of the present invention.

FIGS. 5a and 5b show front and side elevational views of a second preferred embodiment of the present invention. In its simplest form the second preferred embodiment comprises a main unit designated as 31 which is adapted to be attached to a camera in a conventional manner by a mount 11 shown in FIG. 5a. The main unit 31 includes flash head 12 and extendable member 13 pivotally mounted by a ball 15 of a ball and socket joint of the same type described hereinbefore.

As may be seen in the cutaway section for the main unit 31 of FIG. 5a a charging and flash discharge control circuit shown as block 37 is included within main unit 31. It will be understood that this charging and discharge control circuit is conventional in nature and will also include the requisite power supply such as a plurality of batteries.

Since the main unit 31 shown in FIG. 5a includes the basic novel feature of the present invention; i.e. flash head 12 pivotally mounted on extendable member 13, it will be appreciated that main unit 31 may be used by itself to provide many of the advantages of the various embodiments of the present invention. For example, the extension of member 13 with appropriate rotation of head 12 may be used to prevent the eye redness which is often a problem with conventional flash attachments without reliance on bounce flash techniques.

As may be seen in FIG. 5a, the second preferred embodiment comprises not only main unit 31, but a plurality of auxiliary units shown as 32. Each of auxiliary units 32 includes a flash head 12 mounted on extendable member 13. Each auxiliary unit 32 also includes plug 35 which provides both mechanical and electrical connections between auxiliary units 32 and main unit 31.

As may be seen in the cutaway section of the right hand auxiliary unit 32 of FIG. 5a each auxiliary unit includes a charging and discharge circuit shown as block 38 in FIG. 5a. The details of circuit 38 will be explained hereinbelow. It should be noted that circuit 38 does not include either batteries or a transformer and comprises a few lightweight components. Since the heavier components associated with the charge and discharge circuitry, mostly batteries and a transformer, are contained within main unit 31 it may be seen that a simple friction fitting electromechanical connection comprising plug 35 and socket 36 (shown in phantom in main unit 31) is sufficient to secure the auxiliary units 32 to main unit 31.

As may be seen from FIG. 5b, the preferred form of plug 35 for each of auxiliary units 32 comprises a pentangular plug.

The important feature to be noted from the preferred form of plug 35 is that said plug is bilateraly symmetrical about line 39 shown in FIG. 5b. Since head 12 may be rotated at least 180° in a direction by arrow 40 in FIG. 5b it will be appreciated that the bilateral symmetry of plug 35 about line 39 allows each of the auxiliary units 32 to be attached to either the right hand or left hand side of main unit 31. Thus it will be appreciated that the second preferred embodiment of the present invention includes a main unit shown as 31 in FIG. 5a which may also be used in combination with a plurality of auxiliary units 32. It will be appreciated that this embodiment of the invention includes modular auxiliary units which may be added in a daisy chain type fashion, the number of which will be limited mainly by the charging capability of charge and discharge control circuit 37 of main unit 31.

Note from the cutaway portion of FIG. 5a that each auxiliary unit 32 also includes a socket 36' of the same type as sockets 36 in main unit 31. Note also that each socket 36' of auxiliary unit 32 is wired in parallel with plug 35 of the auxiliary unit. It will therefore be appreciated that the second preferred embodiment shown in FIGS. 5a and 5b may be used to provide an array of flash heads 12 which may be positioned to give a wide spread for the light sources when taking a flash picture.

Such an array will eliminate shadows and eye redness and allow the user of the portable hand held camera to achieve a quality of flash pictures similar to those taken in a studio environment, or under the controlled conditions of copy stand photography.

Furthermore, under a given set of lighting conditions for particular film speed, it is possible to divide the necessary light produced by a flash evenly among an array of flash heads 12 thus reducing the amount of light energy required to be produced by each flash head. This arrangement will extend the life of the individual flash tubes within the flash heads 12, another advantage of the present invention over the prior art.

FIG. 6 shows a schematic representation of the circuitry included within this charge control block 38 for each of auxiliary units 32 of the second preferred embodiment.

Note that each plug 35 includes three electrical conductors 45, 46, 47. As may be seen from FIG. 6 conductor 45 is the ground for the system. Conductor 46 carries the current to charge capacitor 41 which stores the electric charge which will be used to ignite flash tube 48. Diode 42 prevents capacitor 41 from discharging back via line 46 in a conventional manner.

It will be understood that the output of SCR 49 to flash tube 48 represents conventional connections to a flash tube including high voltage terminals and firing terminals.

Line 47 is the line used to control firing of flash tube 48.

As is shown diagramatically in FIG. 6, the firing of flash tube 48 is controlled by an SCR 49. A positive voltage pulse on line 47 is provided to the gate of SCR 49 causing same to conduct. When SCR 49 begins to conduct, capacitor 41 is rapidly discharged through flash tube 48 thus creating the flash of visible light.

Since conductors 45, 46 and 47 are paralleled through from plug 35 to receptacle 36' of each of auxiliary units 38, it will be appreciated that line 46 for each of auxiliary units 32 will be used to charge the respective capacitor 41 for that unit.

It will further be appreciated that so long as main unit 31 provides a pulse of sufficient power on line 47 for all of auxiliary units 32, that sufficient current will be provided to the gates of SCRs 49 to fire all flash tubes 48 simultaneously.

FIGS. 7, 8 and 9 show alternative means of providing the firing current from the capacitor to each flash tube. FIG. 7 shows the most preferred form of this apparatus in the environment of the first preferred embodiment of the present invention as shown in FIG. 1.

The discharge circuit 37' is shown as a block in FIG. 7. It is to be understood that this circuit includes an output terminal 52 supplying cables 55 and 56 with the current to fire the flash tubes. As may be seen from FIG. 7 cables 55 and 56 are each wrapped about spindles 57 and 58, respectively. Spindles 57 and 58 are journaled in supports 59 and 60 which allow rotational movement of spindles 57 and 58 around their longitudinal axes.

The other ends of spindles 57 and 58 are mounted in spring housing 50. It it to be understood that spring housing 50 contains spring driven apparatus which tends to cause spindles 57 and 58 to rotate in the direction of arrows 61 shown in FIG. 7. The preferred form of spring drive within spring housing 50 comprises a pair of loosely wound helical leaf springs (not shown) similar to the main springs for a conventional wristwatch. Thus it may be seen that when extendable member 13a is extended as shown in FIG. 7, conducting cable 55 will be unwound from spindle 57. Upon the contraction of extendable member 13a the helical spring (not shown) within spring housing 50 will cause spindle 57 to rotate in the direction of arrow 61 coiling up conducting cable 55 so that it will appear much as coil conductor 56 associated with extendable member 13b in FIG. 7.

FIG. 8 shows an alternative means for providing electrical power to the flash tube of each of flash heads 12 from the capacitor of the discharge circuit. The alternative means includes a coiled cable 65 within a multiple section extendable member 13'. Extendable member 13' as shown in FIG. 8 comprises three sections and it will therefore be understood that the showing of two sections as in the previous drawings or three sections as in FIG. 8 is not to be considered a limitation on the present invention.

Within each section of extendable member 13' coiled cable 65 has a sufficient length of coil to extend the full length of the section within permanently distending any of the coils thereof.

At the bottom of each section of extendable member 13 an annular clamp 66 secures cable 65.

Near the lower portion of each of the sections of extendable member 13 is an annular member 67 which defines a volume 68 between annular securing means 66 and annular member 67. It is within volume 68 that a significant portion of coiled cable 65 may be stored when extendable member 13 is compressed. Note that each of the sections of extendable member 13 include a flange 69 at the bottom thereof which engages the annular member 67 in order to prevent flange 69 from crushing coil cables 65 upon complete compression of extendable member 13'.

FIG. 9 shows the third alternative means for transferring firing current from discharge circuit 75 to flash tube 70. It should be understood that the third alternative embodiment shown in FIG. 9 is preferably rectangular or square in cross section in order to simplify design of the electrical connection and to enhance the physical strength of the rectractable member.

While the third alternative embodiment may comprise any number of sections, two are shown in FIG. 9. For the sake of simplicity it will be understood that the connections shown may be generalized to any number of telescoping sections. As may be seen in FIG. 9 flash tube 70 is fired via a pair of conducting terminals 71 and 72. Terminals 71 and 72 are each connected to one of a pair of conducting strips 76 which line the inside of section 77 on opposite faces thereof.

It is to be understood that section 77 is either made of an insulating material or provided with appropriate insulation between conducting strips 76 and the body of section 77. As will be apparent to those skilled in the art conducting strips 76 may be made of any suitable electrical conductors such as copper or aluminum.

The lower portion of section 77 includes a flange surrounded by insulating flange member 78. Conducting strips 76 are electrically connected via conductors 79 to conducting springs 80.

Conducting springs 80 comprise compressed leaf spring of a suitable conducting material. Conducting springs 80 extend outward from the outer portion of section 77 toward the inner portion of section 81 which in turn is lined with a pair of conducting elements 82. Therefore it may be seen that conducting elements 82 are in electrical contact with terminal 71 and 72 via conducting springs 80 conductor 79 and conducting strips 76. The top of section 81 is fitted with an insulator 85 which prevents any short circuit between conducting springs 80 and section 81 in embodiments where section 81 is constructed of an electrically conducting material. It will be apparent that when section 81 is composed of an electrical conductor, it will be necessary to provide an appropriate insulation between section 81 and conducting strips 82.

Conducting strips 82 are electrically connected to terminals 85 and 86 which in turn are connected to discharge circuit 75.

It will therefore be appreciated that during a condition of extension between members 77 and 81, two separate electrical conducting paths will exist between terminals 72 and 86 on the one hand and 71 and 85 on the other. Therefore FIG. 9 shows an embodiment for electrically connecting discharge circuit 75 and flash tube 70 which, while more expensive than the other embodiments shown herein, is completely self contained and not dependent upon a separate conducting cable.

FIG. 10 shows an elevated pictorial of a third preferred embodiment of the present invention.

The third preferred embodiment comprises a main flash unit 88 and a plurality of auxiliary flash units 89, one of which is shown in FIG. 10.

The main unit 88 includes a conventional ASA light scale 98. It also includes a selector switch 90 which is used to select the number of external units 89 connected to the main unit 88. Output jacks 91–94 comprise electrical outputs for attaching external units to the main unit 88. As may be seen from FIG. 10 external units 89 are mounted to main unit 88 via posts 99 which will be understood to fit in a pair of sockets (not shown) in the side of main unit 88. It will be understood that post 99 provides the mechanical connection between main unit 88 and auxiliary unit 89.

Electrical connection between main unit 88 and auxiliary unit 89 is provided through three conductor plug 96 which is to be plugged one of external jacks 91–94 and cable 97.

It is to be understood that the third preferred embodiment of FIG. 10 includes main unit 88 and up to four auxiliary units such as the single auxiliary unit 89 shown in FIG. 10. The third preferred embodiment is selectively operable to either fire all of the flash heads 12 for all units simultaneously when switch 95 is in the simultaneous (SIM) position or to fire each of flash heads 12 sequentially upon each occurrence of a signal from the camera (not shown) indicating that the shutter is being open. The sequential firing of the flash heads will be understood to occur when selective switch 95 is in its sequential (SEQ) position.

It will therefore be appreciated that assuming a sufficient number of capacitors associated with the units of FIG. 10 are charged, that a very "rapid fire" sequence of photographs may be taken under conditions requiring same. Therefore it will be appreciated that the third preferred embodiment is a flash attachment usuable with a camera having a motor driven film advance that will take a plurality of pictures within a matter of one or two seconds.

It is to be further understood that the selection of four as the number of external units to be used with the third preferred embodiment of the present invention is preferred and is in no way to be considered limiting of the scope of the present invention.

FIG. 11 shows the circuitry for controlling the charging and discharging of main unit 88 and auxiliary units 89 of the third preferred embodiment.

The circuitry of FIG. 11 controls the sequential firing and charging for the external flash units of the third preferred embodiment. The control circuit for the sequential firing is constructed basically around a pair of counters 115 and 116. A conventional charging circuit 117 provides the charge to the firing capacitors for each flash tube. An analog multiplexer 120 routes the output of the charging circuit 117 to the appropriate capacitor associated with an external unit or the internal flash tube.

The operation of the control circuit is simple and most easily understood by considering that counter 115 together with decoder 121 controls which of the flashes will be fired upon the occurence of a signal from shutter switch 125 and to that counter 116 controls the particular one of the flash units which is currently being recharged. It is therefore convenient to refer to counter 115 as the "firing counter" and counter 116 as the "charging counter".

The control circuitry as shown in FIG. 11 will fire the flash tubes associated with the third preferred embodiment in a predetermined order and similarly will charge a discharged flash in a predetermined order so as to minimize the time in which no available charged flash is present.

A four bit magnitude comparator 126 detects when all of the capacitors have been charged.

It is to be understood that shutter switch 125 corresponds to a signal from the camera (not shown) to which the present invention is attached indicating that a flash should be fired.

A plurality of comparators 127a through 127e detect the charge states of the capacitors for the various flashes of the third preferred embodiment. Block 128 in FIG. 11 shows a typical one of the flash circuits for external units 89 or for the main unit 88 shown in FIG. 10.

Plug 96' schematically represents the electrical connections contained in plug 96 shown in FIG. 10. It is to be understood that plug 96 in FIG. 10 also contains a ground connection which is not separately shown in FIG. 11. It is to be understood that receptable 94' of FIG. 11 corresponds to outlet 94 of FIG. 10. It will therefore be apparent that blocks 91', 92' and 93' represents output jacks 91–93 shown in FIG. 10 each of which will electrically correspond to output 94' shown in FIG. 11.

It will also be understood that output block 129 corresponds to the connection to the flash circuitry of the main unit 88 shown in FIG. 10.

Therefore appropriate understanding of the control for block 128 will lead to understanding of the controls of the similar circuits found in other auxiliary units (not shown) for the third preferred embodiment.

Potentiometer 83' of FIG. 11 is the device controlled by intensity control 83 of FIG. 10. It may be seen that variation of potentiometer 83' will change the voltage which appears at point 130. The voltage of point 130 provides the inverting input for each of comparators 127a through 127e. The positive inputs of comparators 127a through 127e are attached, one to each capacitor, to the firing capacitors for the respective flash circuits. As may be seen in FIG. 11 comparator 127e derives its non inverting input from point 131 which will be at the voltage appearing across charging of capacitor 141 for auxiliary unit No. 4. Inspection of FIG. 11 will show that comparator 127a derives its non inverting input from the line leading to the charging capacitor for the main unit. Comparators 127b through 127e detect the voltage across the capacitors associated with external units 1 through 4, respectively.

When the voltage across a particular capacitor becomes greater than the voltage of point 140 which is set by potentiometer 83', the output of that particular comparator will go high indicating that the capacitor is charged to a point which corresponds to a voltage selected by intensity control 83'.

The outputs of comparators 127a to 127e are provided along a cable 132 as inputs to an OR gate 135. It will therefore be appreciated that so long as any one capacitor is charged the output of OR gate 135 which appears at point 136 will be a logical one. It is to be understood that shutter switch 125 represents a signal supplied by the camera (not shown) to which the present invention is attached which indicates that it is appropriate to fire a flash tube. The output of shutter switch 125 passes through gate 137 to line 138 whenever a logical one is present at point 136. When all of the comparators 127a through 127e have logical zero outputs AND gate 137 will block any output from shutter switch 125. Furthermore, logical zero point 136 will be inverted by inverter 139 which will then activate a warning device shown as block 140. It will be understood that warning device 140 may be any appropriate apparatus such as an audible buzzer or a light indicating that none of the flash circuits are sufficiently charged.

Assume that at least one of the flash circuits is charged and available for discharge and that an output is received from shutter switch 125. In this case a positive transition appears on line 138 which triggers one-shot 142. The triggering of one-shot 142 provides a logical one on line 145 from the Q output as one input to each of the AND gates 146a through 146a. As may be seen from FIG. 11 by the example of angate 146e, a logical one ouput from AND gate 146e will fire SCR 149 thus causing capacitor 141 to rapidly discharge through flash tube 148. Again, it will be understood that the connection between SCR 149 and flash tube 148 represents all necessary connections to a conventional flash tube including high voltage terminals and a trigger terminal.

Switch 95' shown in FIG. 11 will be understood to correspond to switch 95 shown in FIG. 10. In the position shown, the flashes of the third preferred embodiment will be fired sequentially. If switch 95' is in its simultaneous (SIM) position, it may be seen that a logical zero is provided along line 147 to each of NAND gates 150a through 150e. Therefore NAND gates 150a through 150e will provide logical ones as one input to each of AND gates 146a through 146e and, upon the next firing of one shot 142, will discharge all of the flash units. When 95' is in its sequential (SEQ) position a logical one is supplied along line 147 causing NAND gates 150a through 150e to supply the logical inverse of the outputs of decoder 121 to one input of AND gates 146a through 146e. Decoder 121 is of a type similar to CMOS 4556B type having a particular output which goes to its logical zero condition upon selection by the binary number present at data inputs D1 through D4. All other non selected outputs are in their logical one condition. Therefore when line 147 contains a logical zero one and only one of AND gates 146a through 146e will be supplied with a logical one from one of the NAND gates 150a through 150e thus conditioning one and only one of the flashes to fire when a logical one appears on line 145.

It is to be understood that rotary switches 90a' and 90b' are ganged and that said switches correspond to selector switch 90 shown in FIG. 10 which selects the number of external auxiliary units attached to main unit 88.

Switches 90a' and 90b' select the particlar output of firing counter 115 and charging counter 116 upon which the counters will clear back to their zero count. As may be seen from FIG. 11 firing counter 115 is clocked on a rising edge of the negated output of one shot 142. Therefore, after the particular flash corresponding to the output of counter 115 has fired when a logical one appears on line 145, the timing out of one shot 142 will clock firing counter 115 to the next sequential flash to be fired.

Firing counter 116 causes the sequential charging of the flash capacitors to "chase" the firing order controlled by firing counter 115. Consider for a moment that after all of the discharge capacitors are charged and that counters 115 and 116 remain quiescent in their 100 states. As may be seen from FIG. 11, four bit magnitude comparator 126 will have the same binary number at both its A inputs and its B inputs and therefore a logical one will be provided to point 151, the "EQUAL" (=) output of the magnitude comprator. The logical one at point 151 disables charging counter 116 and charge circuit 117. Assume that next the operator of the camera snaps a picture which causes flash tube 148 associated with external output No. 4 to fire. The timing out of one-shot 142 causes firing counter 115 to be clocked and, as may be seen from FIG. 11, it will clock back to zero. This removes the logical one from point 151 since magnitude comparator 126 no longer detects equality at its inputs. The appearance of a logical zero at point 151 enables charging counter 116 and charge circuit 117.

However, in the circumstances described, counter 116 will remain at its 100 count which is provided on bus 152. This causes data multiplexer 155 to select its D4 input and analog multiplexer 120 to route the output of charging circuit 117 to its No. 4 ouput and thus to point 131.

As may be seen from FIG. 11 the D4 input of multiplexer 155 is the output of comparator 127e which compares the voltage on capacitator 141 with the voltage selected by intensity selector 83'. Since in the example described capacitor 141 has just been discharged, a logical zero will be provided to the output of multiplexer 155. The output of charging circuit 117 will be provided through analog multiplexer 120 in order to charge capacitor 141. When capacitor 141 has been charged to its appropriate voltage the output of comparator 127e goes high, a condition which passes through the D4 input of multiplexer 155 to its output and thus clocks firing counter 116 which toggles back to zero.

This condition reestablishes equality at the inputs of magnitude comparator 126 and thus again disables counter 116 and charge circuit 117. Note that if very rapid firing of all the flash circuits were accomplished and thus firing counter 115 "caught up" with counter 116, magnitude comparator 126 would still "know" that more charging of capacitors was needed since a zero would be provided at point 136 which constitutes the most significant bit of the B inputs of comparator 126. Note that the most significant bit of the A inputs of comparator 126 is tied to a logical one. It will therefore be appreciated when one or more of the flashes of the third preferred embodiment have fired, magnitude comparator 126 will detect this condition and enable charging circuit 117 and counter 116 and will proceed to sequentially charging the capacitors associated with the fired flashes. Whenever the charging operation "catches up" when the firing operation the charge circuit 117 is disabled. It will therefore be appreciated that since the first circuit fired is the first circuit charged, and the charging sequence "chases" the firing sequence, and that the control circuitry shown in FIG. 11 will always maximize the number of available charged flashes.

From the foregoing descriptions of various embodiments of the present invention it will be apparent to those skilled in the art that other equivalent and alternative embodiments may be constructed. Therefore the scope of the present invention is to be limited only by the claims to follows.

I claim:

1. In a flash attachment comprising a body, mounting means connected to said body for fixedly securing said flash attachment to a camera, said body containing a discharge circuit and power supply means for providing electric charge to said discharge circuit, a flash head including a light-emitting discharge element; the improvement of an extendable member connecting said flash head and said body, said extendable member defining a longitudinal axis running between a first point at which said extendable member connects to said body and a second point at which said extendable member connects to said flash head, said extendable member being selectively extendable along said longitudinal axis, and conducting means electrically connecting said body and said flash head for supplying electric charge to said light-emitting discharge element.

2. A flash attachment as recited in claim 1 wherein said extendable member is pivotally connected to said body.

3. A flash attachment as recited in claim 1 wherein said flash head is pivotally connected to said extendable member.

4. A flash attachment for a camera comprising in combination:

a main unit including a main unit body;

means attached to said main unit body for fixedly securing said main unit to said camera;

at least one auxiliary unit comprising an auxiliary unit body, a flash head attached to said auxiliary unit body by a telescoping extendable member;

means for physically and electrically connecting said auxiliary unit to said main unit; and wherein said auxiliary unit further comprises a storage capacitor for storing electric charge and said main unit further comprises a charging circuit for charging said storage capacitor.

5. A flash attachment as recited in claim 4 wherein said main unit further comprises at least one flash head attached to said main unit body by a telescoping extendable member.

6. A flash attachment comprising a body, mounting means connected to said body for fixedly securing said attachment to a camera;

input means for accepting shutter signals from said camera;

a plurality of flash heads, each of said flash heads including at least one of a plurality of light-emitting discharge elements and each of said flash heads being connected to said body by one of a plurality of telescoping extendable members;

control means for sequentially firing said light-emitting discharge elements in response to a sequence of said shutter signals.

7. A flash attachment as recited in claim 1 wherein said extendable member is a telescoping member.

8. A flash attachment as recited in claim 7 wherein said telescoping member is characterized by at least two sections, one of said sections being journaled within the other of said sections; and said conducting means comprises an electrically conductive strip disposed along the interior of said other of said sections and a flexible contact affixed to said one of said sections in slidable contact with said conductive strip.

* * * * *